United States Patent [19]

Redwine

[11] Patent Number: 5,467,740

[45] Date of Patent: Nov. 21, 1995

[54] DOG AND CAT TRAINER-EXERCISER

[76] Inventor: Steve Redwine, P.O. Box 777, Granger, Wash. 98932

[21] Appl. No.: 307,319

[22] Filed: Sep. 15, 1994

[51] Int. Cl.$^6$ .................................................. A01K 15/02
[52] U.S. Cl. ........................... 119/707; 43/25; 273/414
[58] Field of Search .................... 119/707, 708; 273/414; 446/30, 31, 33; 43/18.1, 25

[56]  References Cited

U.S. PATENT DOCUMENTS

| | | | |
|---|---|---|---|
| 1,699,308 | 1/1929 | Postings | 119/708 |
| 2,307,905 | 1/1943 | Ament | 119/708 |
| 2,597,738 | 5/1952 | Koos | 43/18.1 |
| 3,121,290 | 2/1964 | Brown | 43/18.1 |
| 3,173,713 | 3/1965 | Yasui | 43/18.1 |
| 3,295,499 | 1/1967 | Manchester | 119/708 |
| 3,325,938 | 6/1967 | Minera | 43/25 |
| 3,397,885 | 8/1968 | Nash, Jr. | 273/708 |
| 3,731,925 | 5/1973 | Caldwell | 273/58 C |
| 4,160,607 | 7/1979 | Reichow | 43/18.1 |
| 4,183,163 | 1/1980 | Reimer | 43/18.1 |
| 4,499,855 | 2/1985 | Galkiewicz | 119/708 |
| 4,517,922 | 5/1985 | Lind | 119/708 |
| 4,541,197 | 9/1985 | LeRoue | 43/18.1 |
| 4,542,714 | 9/1985 | Ingraham et al. | 119/708 |
| 4,547,991 | 10/1985 | Searcy | 43/25 |
| 4,712,510 | 12/1987 | TaeHo | 119/708 |
| 4,884,807 | 12/1989 | Welch | 119/707 |
| 5,022,345 | 6/1991 | Bolivar et al. | 119/708 |
| 5,237,769 | 8/1993 | Navarro | 43/25 |

FOREIGN PATENT DOCUMENTS

| | | | |
|---|---|---|---|
| 526985 | 3/1954 | Belgium | 446/30 |
| 449612 | 7/1948 | Canada | 446/31 |

*Primary Examiner*—Paul J. Hirsch
*Attorney, Agent, or Firm*—Stratton Ballew

[57] ABSTRACT

A hand held trainer exerciser and method for training and exercising dogs and cats. The exerciser includes a flexible, telescopic pole and reel assembly for casting a training object connected to a retractable anchor line. The reel has an adjustable drag mechanism to selectably increase or decrease drag on the anchor line, so the dog or cat can pull line off against the reel drag. The training object is designed to be attractive to a dog or cat, and to be pursued while the lure is cast through the air or dragged along the ground.

13 Claims, 2 Drawing Sheets

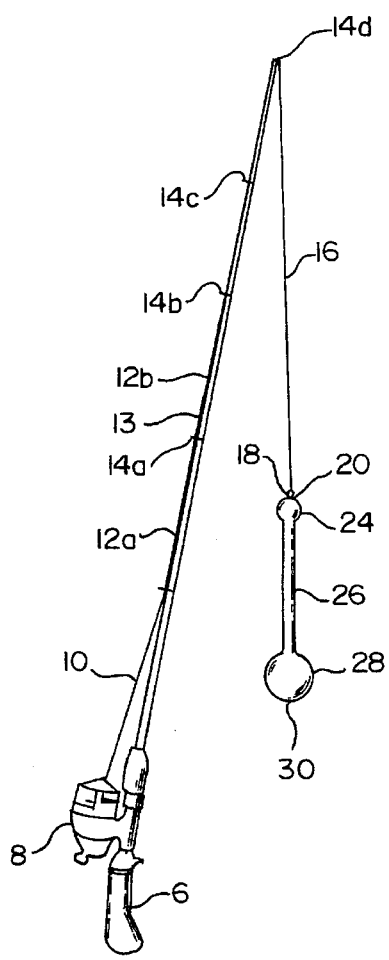
FIG. 1
FIG. 2
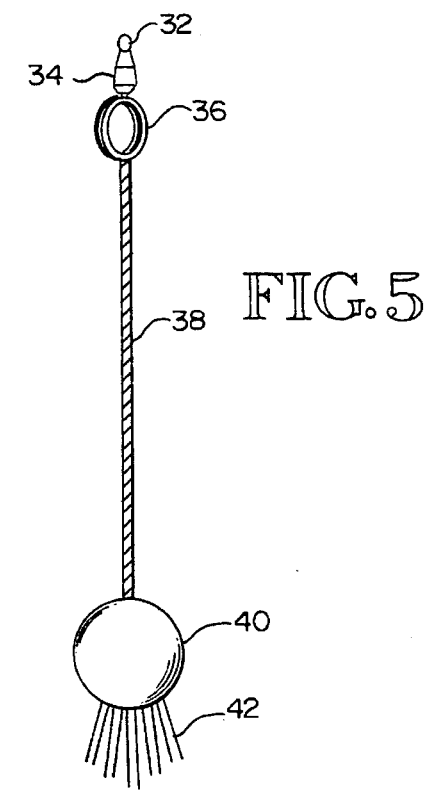
FIG. 5

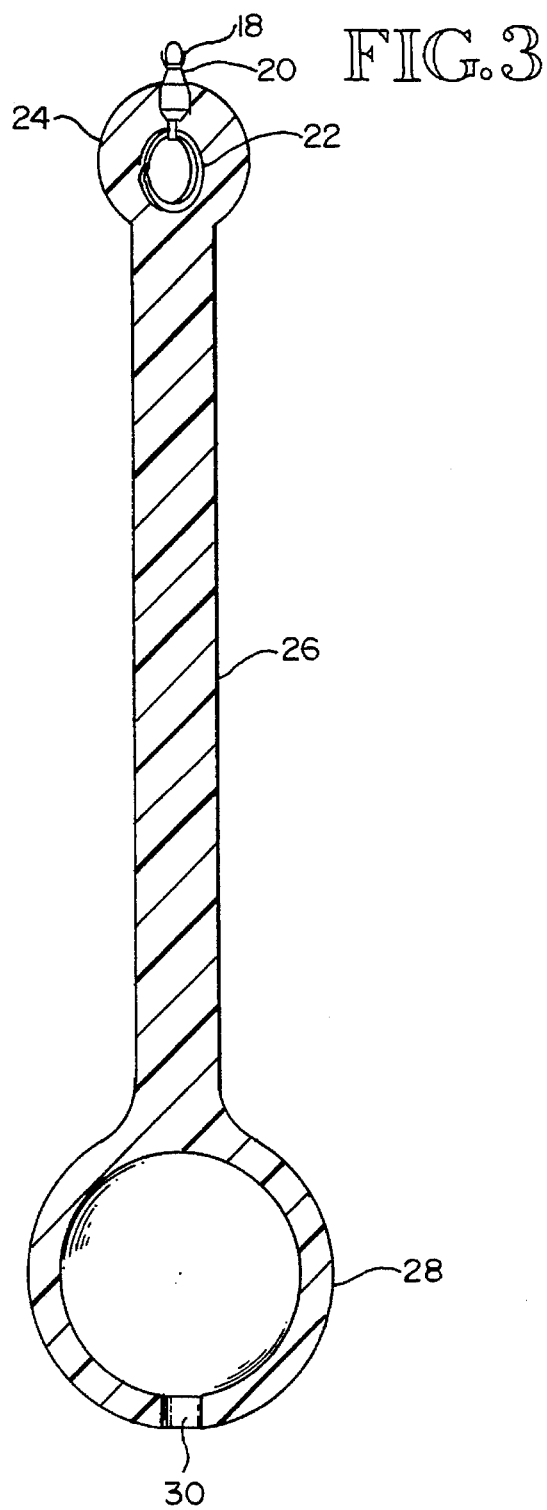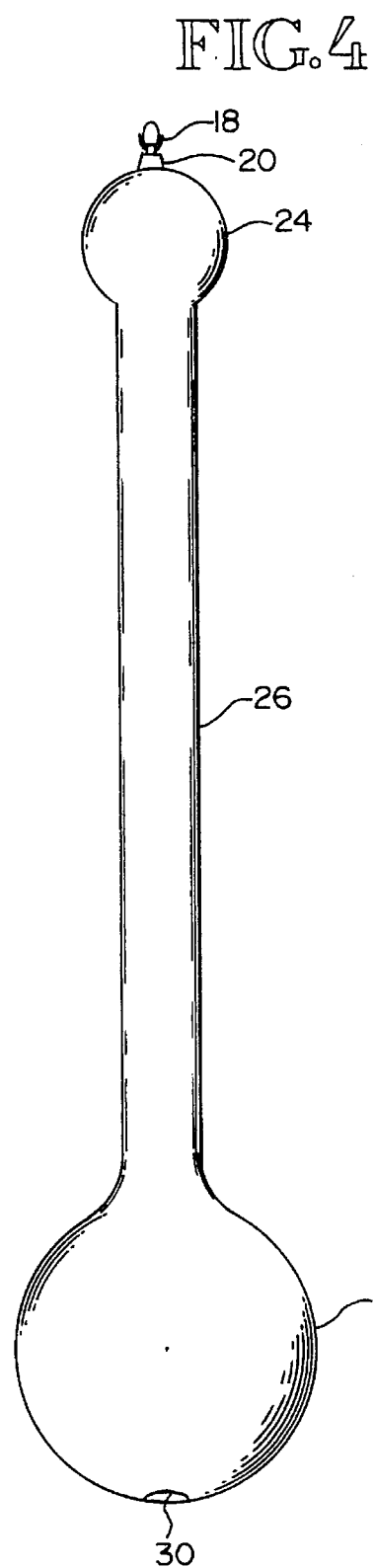

DOG AND CAT TRAINER-EXERCISER

BACKGROUND

This invention relates to a telescopic pole and reel, specifically to a pet trainer and exerciser. This invention utilizes the telescopic pole and reel to cast out a target object for either a dog or cat to retrieve, hunt, stalk or chase for a cardio-vascular workout.

Heretofore, exercising or playing with your pet has been approached by several different methods. U.S. Pat. No. 3,295,499 to Manchester shows a stationary spring where the action toy is attached to a small hanging arch. When the object that hangs from the arch is attacked by the cat, the object springs back and forth by the use of a rubber band. There is also a safety feature that allows the animal to pull loose, via a magnet, in case the cat gets tangled. This toy is basically for the amusement of the cat and for the human onlooker, and it has very little value in the exercise of the animal.

The animal exerciser in U.S. Pat. No. 2,307,905 to Ament shows a wooden rod with a flexible band attached to a ball, limiting play for the animal to the scope of the short flexible band.

The kitty tease in U.S. Pat. No. 4,499,855 is very similar to Ament's patent in that operation is with a flexible rod instead of a flexible band, both limited to a small animal, and to the length of the flexible band or length of twine or Nylon. Cost appears to be a contributing factor in their limitations, and their use as an amusement toy.

The expandable wand pet toy in U.S. Pat. No. 4,712,510 to Tae-Ho is my last example of a search of the related art. This is an example of another stationary cat toy with limited cardiovascular exercise ability, and limited to a small area when operating.

The related art is limited to amusement toys, mostly directed as cat toys used in close proximity to the cat, with limited exercise capabilities.

No training method is claimed among any of the related art patents found in the search.

The advantage of my invention is that it is a quality dog or cat trainer and exerciser. It not only trains animals to retrieve, hunt, stalk and chase but can also give dogs and cats of all sizes the exercise they could only receive from running. It would be very difficult for any animal to run while engaged in amusement with the toys described in the related art.

My invention will, in one instance, force the animal to run at high speed in order to capture the target object. Then, by having the drag on the reel set properly for the weight of the animal, you can give the animal the pleasure of pulling and fighting with the target object, and receiving enough resistance to excite the animal. The animals enjoy feeling as if they are taking control, and they pull the line off the reel. Then, as they get tired, the line can be retrieved. This invention lets you exercise or train your animal from long distances at which they may not know you are operating the apparatus. The only limitation to distance is the amount of line on the reel. Transparent line makes it difficult for pets to realize the exerciser is operated by a human.

Accordingly, several objects and advantages of my invention are:

a) the invention is a high quality trainer;

b) using the invention at distances makes the pet feel like it is chasing a small animal that is alive;

c) the invention teaches a dog to retrieve in water or on land for entertainment, and if the dog does not retrieve, you simply reel it back;

d) it is a trainer for hunting dogs to learn the art of retrieving, and teaching the dog to bring back birds;

e) it teaches dogs to be able to find and scare birds for hunters;

f) it helps teach dogs word commands;

g) it teaches cats how to spot prey, and how to stalk mice;

h) if the target object is cast out a long way, the animal thinks it is chasing something that fell from the sky, and by keeping the object moving the animal keeps moving in quick pursuit;

i) the human operator can stay in one place while limiting the activity to a small area or a large area for the animal;

j) the invention gives dogs and cats of any size quick exercise because it allows you to run them up to their full speed, either in straight lines or variations of circular motions;

k) when you are tired or limited in time, your pets get the exercise, not you, and in a very short period of time;

l) the invention allows pets to fight in a form of tug of war by giving them the ability to pull out line from the reel;

m) the invention is attractive for cats or dogs, determined by which target object is attached;

n) the invention does not tangle the line, and makes the target object look alive because of the swivel use;

o) interaction builds friendship with the pet;

p) the telescopic pole and reel closes together for easy carrying or storage; and q) the invention can be used anywhere and for quick exercise when the operator is tired or the weather is bad.

Further objects and advantages are to provide a high quality pet trainer-exerciser that can be used for years in all kinds of weather, with simple operation. This invention will not only be fun for the pet, but also the operator, and will help keep pets healthier through cardiovascular exercise.

BRIEF DESCRIPTION OF THE DRAWINGS

FIG. 1 shows the telescopic pole extended, and the reel.

FIG. 2 shows the telescopic pole in the closed position.

FIG. 3 shows the interior of the rubber dog target object.

FIG. 4 shows the exterior of the rubber dog target object.

FIG. 5 shows the cat target object.

DETAILED DESCRIPTION OF THE INVENTION

Referring first to FIG. 1, there is shown a view of the telescopic pole 13 with reel 8. The pole has a sponge handle 6 in two sections, one piece above the reel and another piece below. This handle 6 gives better gripping capabilities when training or exercising the pet. The reel 8 attaches to pole 13 in the conventional manner, and contains many yards of monofilament line 16, which strings through each of the eyelets 14a, 14b, 14c and 14d. The line 16 is then tied to the smallest split ring 18 or 32, which are welded to ball bearing swivel 20 or 34 respectively. Swivel 20 or 34 is then welded to large split ring 22 or 36 respectively, and then molded or attached to rubber cord 26 or elastic cord 26 or 38, which protects dogs and cats from metal swivel 20 and 34, and attaching split rings 18, 20, 32 and 36. The line 16 coming from reel 8, and strung through eyelets 14a, 14b, 14c and 14d connects the pole 13 to the target object of FIG. 3 for dogs or the target object of FIG. 5 for cats. By casting the target objects of FIG. 3 or FIG. 5 with use of the pole 13 and reel 8 a simple snap of the wrist allows the target object to be thrown long distances without injury of the arm as when throwing an object. This long distance is used when training a dog, or when exciting animals and disguising your presence. The target objects of FIG. 3 and FIG. 5 use a large size swivel for strength in working with large animals, and allows the monofilament line to keep from tangling as the target objects are in operation.

When the reel 6 is open, this will let line 6 travel through eyelets 14a, 14b, 14c and 14d, letting the operator throw the target objects of FIG. 3 and FIG. 5 at various lengths. The various lengths are directly related to the form of exercise or training planned. The closed telescopic pole of FIG. 2 shows the pet trainer-exerciser ready for storage or carrying.

OPERATION OF THE INVENTION

The reel handle 6 gives the operator two places to grip the sponge handle as the invention operates. Reel 8 works by holding a large amount of line 6 and dispensing or retracting as needed. It also works as the anchor and final attachment of the monofilament line 16. The telescope base 10 is the largest segment of the pole, and holds the four telescope sections 12a, 12b, 12c and 12d when the pole is in the closed position of FIG. 2. This allows the trainer-exerciser to be easily carried or stored. Another practical reason for the telescopic pole of this invention is to be able to vary the flexibility of pole 13 so as to be able to train or exercise all sizes of animals simply by collapsing the fourth section 12d and, if you need more strength and less flexibility, collapse section 12d and 12c and the eyelets are now almost touching together for stabilizing. The eyelets 14a, 14b, 14c and 14d work as guides on the pole 13 to keep the monofilament line 16 coming from the reel 8 from tangling, and for smooth dispensing or retrieving of line 16. Small split rings 18 or 32 are tied to line 16 which attaches to the object of FIG. 3 for a dog, or the object of FIG. 5 for a cat. Swivels 20 or 34 allow the target objects of FIG. 3 and FIG. 5 to spin freely. For long throws for retrieval, the swivels 20 or 34 will let the target objects turn as needed without tangling line 16, and allows rotation when the animal retrieves the object. If line 16 is let out and the target object is swung in a large circular motion, swivels 8 or 34 work as a weight for better control, and to keep tangles from occurring. Large split ring 22 is strictly for anchoring swivel 20 and small split ring 18 in the round rubber sphere 24.

The dog target object of FIG. 3 is designed with a rubber cord 26 to protect the dog's mouth in circumstances when the dog does not catch the ball 28 properly when retrieving or exercising. The design lets the ball 28 rotate in circular motions of various sizes smoothly. Hole 30 is for putting a small bell inside the ball 28 to attract the dog.

The cat target object of FIG. 5 attaches to pole 13 by small split ring 32. Ball bearing swivel 34 gives the extra weight needed for throwing light, fluffy ball 40 long distances. It also works as an extra hand to keep the cat target object moving properly to keep the cat's attention. The elastic cord 38 attaches to the large split ring 36 and, when the cat catches fluffy ball 40, the elastic will stretch to absorb some of the shock of stopping a moving object. It also protects the cat from split rings 32 and 36 and ball bearing swivel 34. The colorful ribbons or string 42 attract the cat to fluffy ball 40. This makes it enticing when thrown past the cat like live prey. You can be far enough away that the cat does not realize your presence and, if you rotate in circular motions with the cat in hot pursuit, you can be far enough away to keep the cat from accidentally clawing, or knowing you are operating the pet trainer-exerciser. This gives your pet quick exercise with little of your own effort.

This invention will help create many hours of interactive enjoyment between you and your pet, plus the many benefits that come through health with needed exercise.

It may thus be seen that the pet trainer-exerciser of this invention provides a highly reliable, lightweight, easily-carried and efficient means of training and exercising a pet. It is operable by people of all age groups. While my prior descriptions contain many specificities, these should not be construed as limitations on the scope of the invention, but rather as an exemplification of one preferred embodiment thereof. Many other variations are possible. For example, the invention can be taken with you any time your pet travels with you to provide quick fun exercise when stopping for breaks or when you reach your destination. It packs in a small space, weighs less than 1 pound complete, and provides quality exercise in a limited space. It exercises your pet when your time is limited or you are tired, with little effort from you.

The invention will help train dogs to retrieve and cats to stalk mice. It can also be used in the form of amusement to both you and your pet in simulation of live prey in an atmosphere undetected by the pet. Another example of unique use would be to throw the cat target object over a tree limb, and lower the cat target object down to the cat at the base of the tree. Then you reel the object up, giving the effect of a small animal climbing the tree to escape. Other unusual uses would be at a lake or river's edge dragging the dog target object back and forth in the water, thus exciting the dog to chase it through the water. As can be seen, the usage can vary according to one's imagination. This will give both the operator and the pet many thrilling challenges in either keeping the target object just out of range, or in capturing the target object.

I claim:

1. A hand held trainer exerciser for use by a human trainer to train and exercise dogs and cats of all sizes comprising:

a flexible, telescopic pole having a plurality of telescoping sections for expanding or collapsing the pole, the pole having a handle attached to a base segment of the pole, and a plurality of eyelets attached to the pole between the handle and a tip of the pole;

a reel attached to the pole near the handle, the reel having an adjustable drag mechanism to selectably increase or decrease a drag setting of the reel so that a dog or cat training subject can pull against the reel drag and pull line off of the reel to simulate an activity of fighting and overwhelming a hunting or retrieval subject;

an anchor line releasably and retrievably windable on a spool of the reel, a portion of the line stringable through the eyelets of the pole, the line releasable and retrievable from the reel to provide a variable line length between the reel and a target end of the line to accommodate a variety of training and exercise activities and subjects; and a pet training target object attractive to a dog or cat and otherwise suitable as a target object for the training subject, the target object connectable to the target end of the line and castable a variable distance from the trainer, the object designed to be visually tracked and pursued while the lure is cast through the air or dragged along the ground.

2. A trainer exerciser according to claim 1, including a plurality of target objects interchangeably connectable to the target end of the line, wherein different target objects have specially adapted structures and appearances for training and exercising either a dog or a cat.

3. A trainer exerciser according to claim 2, including a soft, flexible attachment cord attachable to the target end of the line for connecting the target object to the line.

4. A trainer exerciser according to claim 3, including connector means molded or substantially enclosed within an end portion of the attachment cord for safely connecting the target object to the target end of the line.

5. A trainer exerciser according to claim 1, wherein the anchor line is made of a clear, monofilament material.

6. A trainer exerciser according to claim 1, wherein the pole has four terminal telescope sections concentrically arranged and nestable within the base segment, the pole being serially collapsible one segment at a time to allow for use of the pole in a partially collapsed configuration, whereby flexibility of the pole can be selectably modified to accommodate different training and exercise activities or subjects.

7. A hand held trainer exerciser for use by a human trainer to train and exercise dogs and cats of all sizes comprising:

a flexible, telescopic pole having a plurality of telescoping sections serially collapsible one segment at a time to allow for use of the pole in a partially collapsed configuration so that flexibility of the pole can be selectably modified to accommodate different training and exercise activities or subjects, the pole having a handle attached to a base segment of the pole, and a plurality of eyelets attached to the pole between the handle and a tip of the pole;

a reel attached to the pole near the handle, the reel having an adjustable drag mechanism to selectably increase or decrease a drag setting of the reel so that a dog or cat training subject can pull against the reel drag and pull line off of the reel to simulate an activity of fighting and overwhelming a hunting or retrieval subject;

an anchor line of clear monofilament releasably and retrievably windable on a spool of the reel, a portion of the line stringable through the eyelets of the pole, the line releasable and retrievable from the reel to provide a variable line length between the reel and a target end of the line to accommodate a variety of training and exercise activities and subjects;

a plurality of pet training target objects attractive to a dog or cat and otherwise suitable as target objects for the training subject, the target objects interchangeably connectable to the target end of the line by soft, flexible attachment cords and castable a variable distance from the trainer, the target objects designed to be visually tracked and pursued while the lure is cast through the air or dragged along the ground; and connector means molded or substantially enclosed within an end portion of the attachment cord for safely connecting the target object to the target end of the line.

8. A training and exercising method for training and exercising dogs and cats of all sizes by a human trainer comprising the steps of:

providing a flexible, telescopic pole having a handle attached to a base segment of the pole, and a plurality of eyelets attached to the pole between the handle and a tip of the pole;

mounting a reel to the pole near the handle, the reel having an adjustable drag mechanism to selectably increase or decrease a drag setting of the reel;

attaching an anchor line to a spool of the reel and stringing a portion of the line through the eyelets of the pole, the line being releasably and retrievably wound on the spool reel to provide a variable line length between the reel and a target end of the line to accommodate a variety of training and exercise activities and subjects; and connecting a pet training target object attractive to a dog or cat and otherwise suitable as a target object for training and exercising dogs or cats to the target end of the line;

opening a bail of the reel to allow the anchor line to flow freely from the reel;

flexing the pole to forcibly cast the training object a variable distance from the trainer;

allowing a cat or dog training subject to pursue the target object; and retrieving the target object by using the reel to wind the anchor line back onto the spool.

9. A training and exercise method according to claim 8, including the step of adjusting a drag setting of the reel to selectively increase or decrease a reel drag to accommodate different training activities or subjects.

10. A training and exercise method according to claim 9, including the step of allowing the dog or cat training subject to capture the target object and pull against the reel drag and pull line off of the reel to simulate an activity of fighting and overwhelming a hunting or retrieval subject.

11. A training and exercise method according to claim 8, wherein the anchor line is transparent, and wherein during the step of flexing the pole to cast the training object, the trainer positions his or her body at a sufficient distance from the training subject, or in a visually hidden location relative to the training subject, so that the training subject does not perceive that the target object has been cast by the trainer.

12. A training and exercise method according to claim 8, including the step of telescoping the pole to a partially collapsed configuration so that flexibility of the pole is selectably modified to accommodate different training and exercise activities or subjects.

13. A training and exercise method according to claim 8, including repeated steps of telescoping the pole one section at a time to a partially collapsed configuration so that flexibility of the pole is repeatedly, selectably modified to accommodate different training and exercise activities or subjects.

* * * * *